United States Patent
Mori et al.

(10) Patent No.: US 10,196,041 B2
(45) Date of Patent: Feb. 5, 2019

(54) IMAGING SYSTEM

(71) Applicant: TOYOTA JIDOSHA KABUSHIKI KAISHA, Toyota-shi, Aichi-ken (JP)

(72) Inventors: Takeki Mori, Nagoya (JP); Akio Kimura, Toyota (JP); Atsutoshi Sakaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/385,524

(22) Filed: Dec. 20, 2016

(65) Prior Publication Data

US 2017/0240138 A1 Aug. 24, 2017

(30) Foreign Application Priority Data

Feb. 19, 2016 (JP) ................. 2016-029563

(51) Int. Cl.
*B60S 1/02* (2006.01)
*H05B 3/84* (2006.01)
*H05B 1/02* (2006.01)
*H04N 7/18* (2006.01)
*B60J 1/00* (2006.01)

(52) U.S. Cl.
CPC ............... *B60S 1/026* (2013.01); *B60J 1/002* (2013.01); *H04N 7/183* (2013.01); *H05B 1/0236* (2013.01); *H05B 3/84* (2013.01)

(58) Field of Classification Search
None
See application file for complete search history.

(56) References Cited

U.S. PATENT DOCUMENTS

| 6,144,022 | A | * | 11/2000 | Tenenbaum | B60S 1/0822 15/DIG. 15 |
| 2006/0115120 | A1 | * | 6/2006 | Taniguchi | B60R 1/00 382/104 |
| 2013/0312442 | A1 | * | 11/2013 | Suzuki | B60H 1/00921 62/160 |
| 2016/0232423 | A1 | * | 8/2016 | Zhong | G06K 9/52 |
| 2016/0339767 | A1 | | 11/2016 | Enomoto et al. | |
| 2018/0056942 | A1 | * | 3/2018 | Oikawa | B60R 1/00 |
| 2018/0213610 | A1 | * | 7/2018 | Futatsugi | B60S 1/0848 |

FOREIGN PATENT DOCUMENTS

| JP | U62-179859 | 11/1987 |
| JP | H02-175359 A | 7/1990 |
| JP | H05-155313 A | 6/1993 |
| JP | 2004-112329 A | 4/2004 |
| JP | 2009-111546 A | 5/2009 |

(Continued)

*Primary Examiner* — Todd M Melton
*Assistant Examiner* — Jason R Roberson
(74) *Attorney, Agent, or Firm* — Oliff PLC

(57) ABSTRACT

An imaging system mounted on a vehicle is proposed. The imaging system includes: an imager configured to capture an image of the outside of a vehicle through a glass of the vehicle; a heater configured to heat at least an imaging region of a windshield included in an imaging range of the imager; an image processer configured to detect a fogging level of an image captured by the imager; and a controller configured to adjust the output of the heater based on a detected fogging level and allow the heater to heat the imaging region of the windshield.

2 Claims, 6 Drawing Sheets

(56) References Cited

FOREIGN PATENT DOCUMENTS

| | | |
|---|---|---|
| JP | 2010-64641 A | 3/2010 |
| JP | 2012-228916 A | 11/2012 |
| JP | 2013-226974 A | 11/2013 |
| JP | 2014-101004 A | 6/2014 |
| JP | 2014-187497 A | 10/2014 |
| JP | 2015-012063 A | 1/2015 |
| JP | 2015-163503 A | 9/2015 |

* cited by examiner

10a

10b

IMAGING SYSTEM

BACKGROUND

1. Technical Field

The present disclosure relates to an imaging system mounted on a vehicle.

2. Description of Related Art

There has been conventionally known a system in which a camera is mounted within a vehicle cabin to capture an image of the outside of the vehicle through a glass. A driving support system mounted on a vehicle detects a pedestrian or another vehicle around the vehicle from an image captured by a vehicle-mounted camera through a glass, so as to perform driving support processing, such as outputting a warning to the driver. If a glass region included in the imaging range of the vehicle-mounted camera fogs up, however, the vehicle-mounted camera may not favorably capture an image of the outside of the vehicle, so that the driving support system is unable to perform the driving support processing based on a captured image. Accordingly, it would be suitable to prevent the glass fogging or defog the glass so that the vehicle-mounted camera can favorably capture an image of the outside of the vehicle.

JP-A-2014-101004 discloses an imaging system for capturing an image of the outside of a vehicle through a glass of the vehicle. The imaging system disclosed in JP-A-2014-101004 activates, upon detection of an outside air temperature lower than a predetermined temperature when the engine is started, a hot-wire heater embedded in the windshield to heat a glass region corresponding to the imaging range of an image sensor until a predetermined time elapses, and repetitively performs the heating process using the hot-wire heater with a predetermined period.

JP-A-2014-101004 also discloses a glass fogging prevention system for preventing glass fogging or defogging a glass by activating a dehumidification function of an air conditioner when it is found that glass fogging has occurred or may occur based on outputs from a temperature sensor and a humidity sensor. The housing for housing the temperature sensor, humidity sensor, and image sensor is attached to a glass.

[Patent Document 1] Japanese Unexamined Patent Application Publication No. 2014-101004

With the technique disclosed in JP-A-2014-101004, however, the heating process using the hot-wire heater is repetitively performed with a predetermined period, so that the glass may be unnecessarily heated.

SUMMARY

The embodiments address the above-described issues, and a general purpose thereof is to provide a technology for preventing a heater excessively heating a glass during glass defogging control.

To solve the problem above, an imaging system of one embodiment is an imaging system mounted on a vehicle, and the imaging system comprises: an imager configured to capture an image of the outside of a vehicle through a glass of the vehicle; a heater configured to heat at least a glass region included in an imaging range of the imager; a fogging level detector configured to detect a fogging level of the glass region; and a controller configured to adjust the output of the heater based on the detected fogging level and allow the heater to heat the glass region.

According to the embodiment, since the output of the heater is adjusted based on the detected fogging level to heat the glass region, control can be provided so that the output of the heater is decreased when the fogging level is low, and the output of the heater is increased when the fogging level is high. In this way, by decreasing the output of the heater when the fogging level is low, excessive heating of the glass region can be prevented.

The imaging system may further comprise a temperature detector configured to detect a temperature of a glass region. The controller may adjust the output of the heater based on the fogging level and a temperature detected by the temperature detector. Accordingly, the output of the heater can be adjusted while the temperature is monitored, so that excessive heating of the glass region can be prevented.

The controller may adjust the output of the heater so that the fogging level is maintained lower than or equal to a predetermined value and the temperature detected by the temperature detector is maintained constant. Accordingly, repetition of heating and cooling of the glass region can be prevented while the state of the glass region free from fogging is maintained.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Various embodiments now will be described. The embodiments are intended to be illustrative, not limiting.

Figure 1:
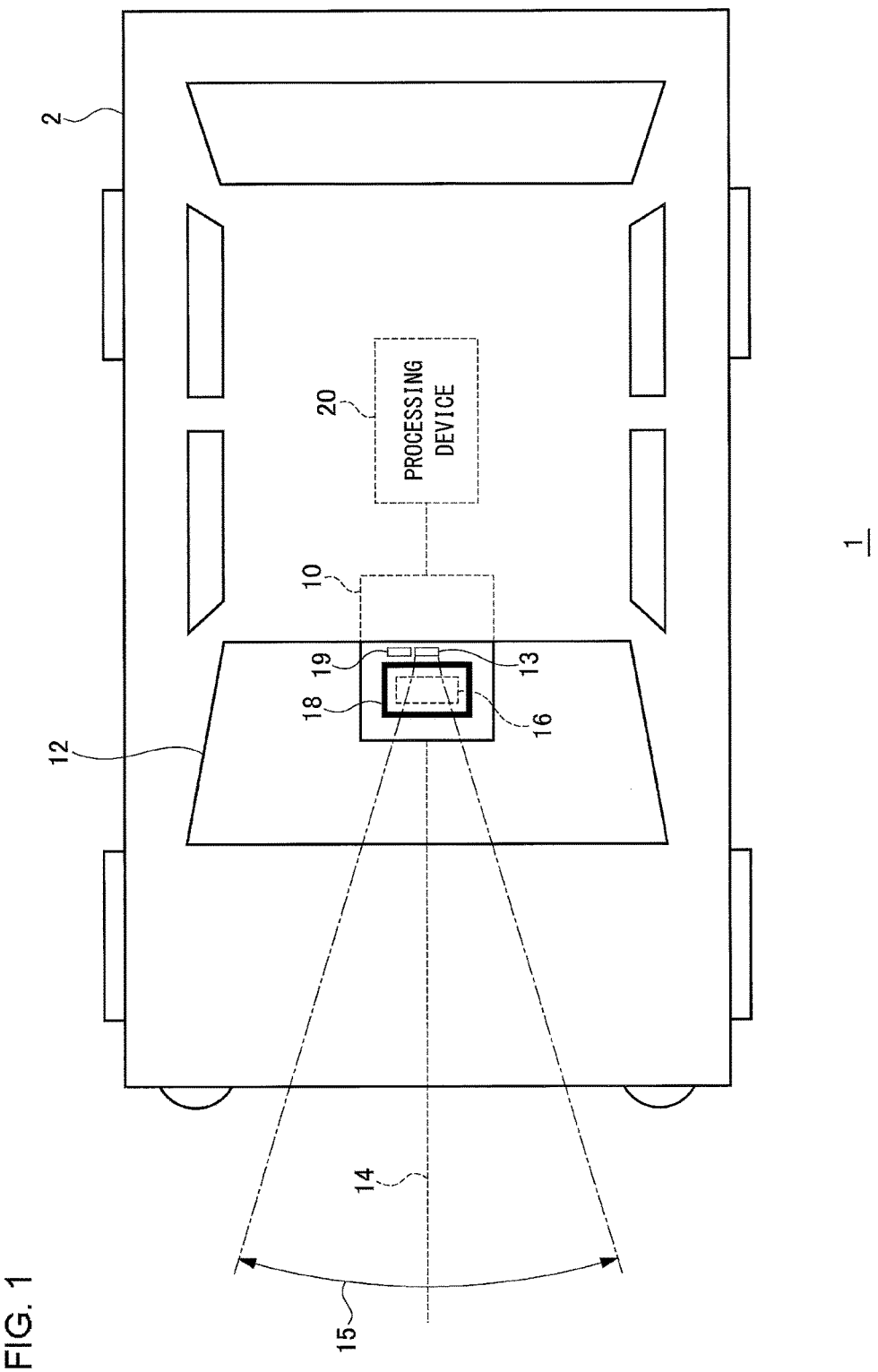
FIG. 1 is a diagram that shows an imaging system mounted on a vehicle.

FIG. 1 shows an imaging system 1 mounted on a vehicle. The imaging system 1 of an embodiment comprises a camera 10, a heater 18, and a processing device 20. The camera 10 is mounted within a vehicle 2 and captures an image of the outside through a glass of the vehicle 2. In the example shown in FIG. 1, the camera 10 captures an image of an area in front of the vehicle 2 through a windshield 12 of the vehicle. The camera 10 comprises an imager 13 and may be configured as a monocular camera, a stereo camera, or an infrared camera. The casing of the camera 10 also houses a temperature sensor 19 and an object detection sensor (not shown). The casing of the camera 10 may be attached to the windshield 12, the rearview mirror, or the ceiling of the vehicle cabin, for example, so that an optical axis 14 of the imager 13 is directed to the front of the vehicle.

The camera 10 periodically captures an image of the outside of the vehicle and provides the captured image to the processing device 20. An imaging range 15 represents a viewing angle in a horizontal direction of the imager 13, and an imaging region 16 represents a region of the windshield 12 included in the imaging range 15 of the camera 10, i.e., a region of the windshield 12 within which an image is captured by the imager 13.

The heater 18 is provided around the imaging region 16 to heat at least the imaging region 16. For example, the heater 18 may be a hot wire that produces heat with electricity supplied. The hot wire as the heater 18 may be provided on an inner surface of the windshield 12, or may be provided inside the windshield 12. Also, the hot wire as the heater 18 may be formed of a transparent material and provided within the imaging region 16, instead of around the imaging region 16. The heater 18 may be provided on the camera 10 side, and the heater 18 may be a hot wire provided on a hood of the camera 10 or may have a configuration for supplying hot air to the imaging region 16, for example.

The heater 18 can be adjusted to change the output thereof under the control of the processing device 20. Heat provided by the heater 18 removes water or ice adhered to the imaging region 16, which can be cleared accordingly.

The temperature sensor 19 is provided on the camera 10, so as to detect temperatures around the camera 10, including a temperature of the camera 10 and a temperature of the imaging region 16 of the windshield 12 close to the camera 10. The temperature sensor 19 can detect the situation where the imaging region 16 of the windshield 12 heated by the heater 18 reaches an excessively high temperature and the situation where the camera 10 reaches an excessively high temperature. For example, the temperature sensor 19 and the camera 10 need not necessarily be provided in the same casing, and the temperature sensor 19 may be provided separately from the camera 10 and may be provided on the imaging region 16 of the windshield 12.

Figure 2:
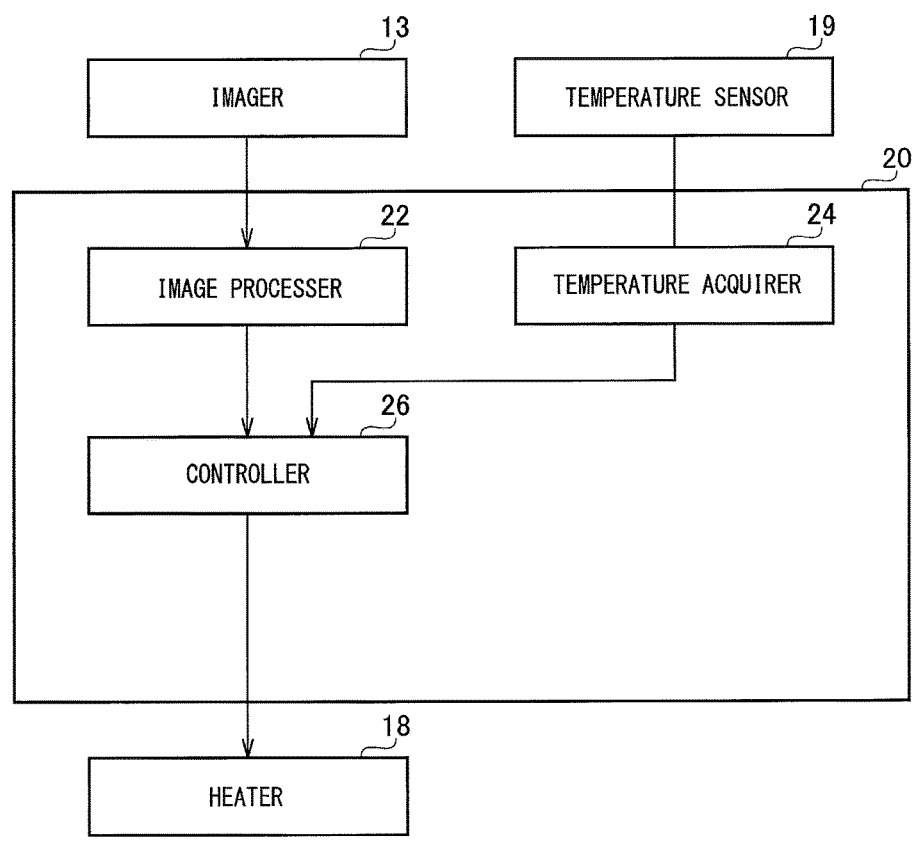
FIG. 2 is a diagram that shows a functional configuration of an imaging system including a processing device.

FIG. 2 shows a functional configuration of the imaging system 1 including the processing device 20. The processing device 20 comprises an image processor 22, a temperature acquirer 24, and a controller 26. Each of the elements represented by functional blocks for performing various processes shown in FIG. 2 can be implemented by a circuit block, a memory, an LSI or the like in terms of hardware, and by a program loaded into a memory or the like in terms of software. Accordingly, it will be obvious to those skilled in the art that these functional blocks may be implemented in a variety of forms by hardware only, software only, or a combination thereof, and the form is not limited to any of them.

The image processor 22 has a function to acquire an image periodically captured by the imager 13 and detect a fogging level of the captured image. The fogging level shows how the imaging region 16 of the windshield 12 fogs up and is provided as a numerical value representing the degree of blur. Since an image within the imaging region 16 of the windshield 12 is captured by the imager 13, if fogging or icing of the imaging region 16 occurs, the imager 13 will be unable to favorably capture an image of the outside, causing a blurred captured image.

In the embodiment, a captured image acquired by the camera 10 is used for driving support processing performed by a driving support system. The image processor 22 also has a function to detect an object, including a vehicle and a human, from a captured image for driving support processing. More specifically, the image processor 22 detects an edge or an angle included in a captured image as a feature point, and detects an object included in a captured image using template matching. Also, the image processor 22 may track a feature point in multiple captured images, which are temporally successive, so as to detect information including the difference between the speeds of an object and the subject vehicle, for example. Based on such information, the driving support system judges the possibility of collision between the detected object and the subject vehicle and performs driving support processing, such as outputting a warning to the driver. Since a feature point of a stationary object, such as a structure, is extracted from a difference between multiple captured images, the vehicle 2 may suitably travel at a predetermined speed (5 km/h, for example) or higher so that the image processor 22 can detect a feature point. In the following, processing for detecting a fogging level will be described with reference to new drawings.

Figure 3A:
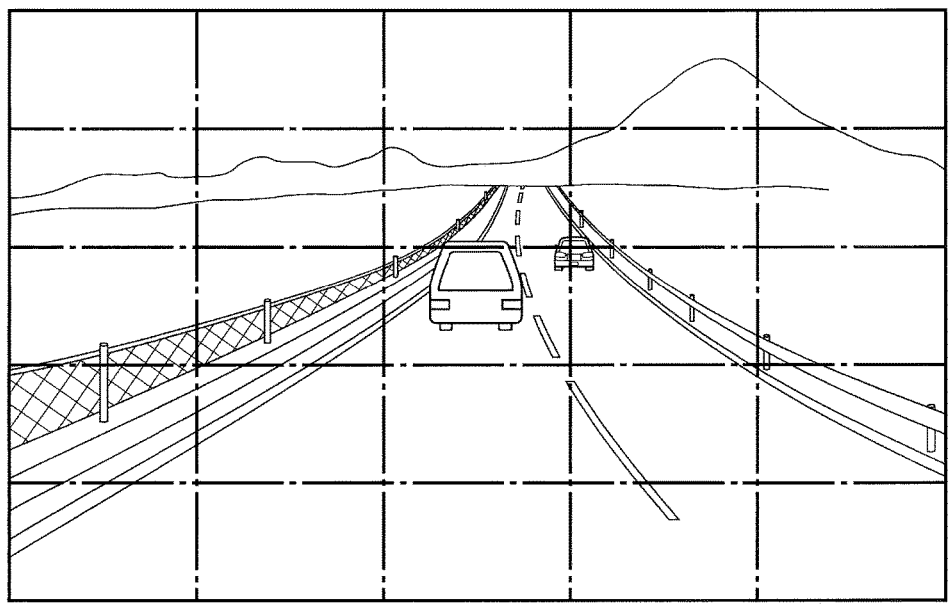
FIGS. 3A-3B are diagrams that each show an example of an image captured by an imager.
Figure 3B:
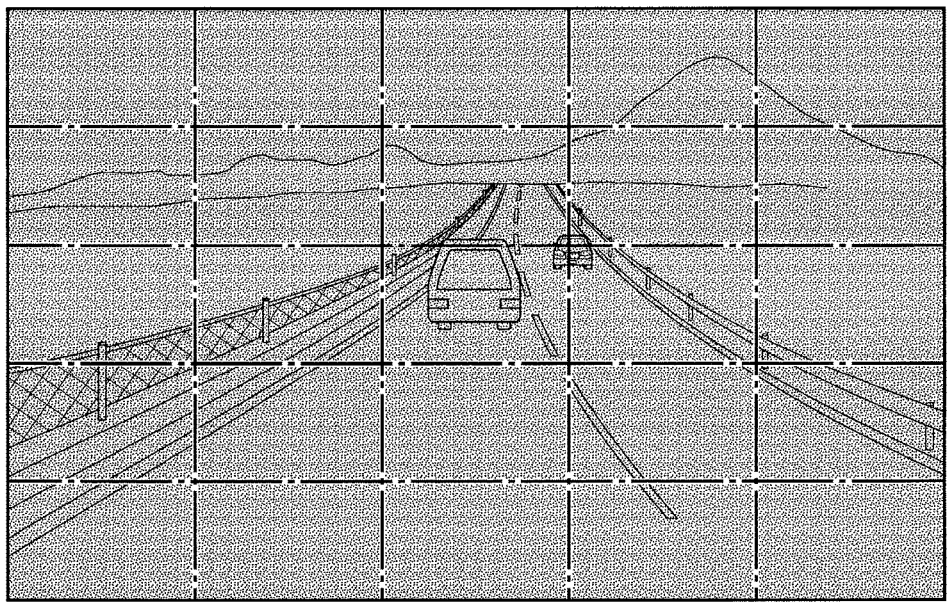

FIGS. 3A and 3B show examples of images captured by the imager 13. A captured image 10a shown in FIG. 3A is favorably captured, so that the image processor 22 can analyze the captured image 10a to detect feature points, so as to detect an object included in the captured image. On the other hand, a captured image 10b shown in FIG. 3B is not favorably captured, so that the image processor 22 is unable to suitably detect feature points from the captured image 10b.

The image processor 22 of the embodiment divides a captured image into multiple regions, as shown in FIGS. 3A and 3B, and identifies a divided region in which a feature point can be detected and a divided region in which no feature point can be detected. In this example, a captured image is divided into 25 (5×5) regions. Since the captured image 10a of FIG. 3A is favorably captured, the image processor 22 can detect a feature point in each divided region of the captured image 10a. On the other hand, since the captured image 10b of FIG. 3B is not favorably captured, the image processor 22 is unable to detect a feature point in some divided regions of the captured image 10b.

The image processor 22 of the embodiment obtains a fogging level based on the number of divided regions in which a feature point can be detected and the number of divided regions in which no feature point can be detected. For example, the image processor 22 obtains, as a fogging level, a ratio of the number of divided regions in which no feature point can be detected to the total number of the divided regions. When no feature point can be detected in 5 divided regions among 25 divided regions, for example, the image processor 22 obtains the fogging level of 20%. Thereafter, the image processor 22 transmits the fogging level thus obtained to the controller 26.

The temperature acquirer 24 acquires information regarding a temperature detected by the temperature sensor 19 and transmits the information regarding a temperature thus acquired as a detected temperature to the controller 26.

When the heater 18 is a hot wire, the controller 26 performs control for producing heat by energizing the hot wire. The controller 26 adjusts the output of the heater 18 based on a detected fogging level and a detected temperature to heat the imaging region 16 of the windshield 12. The controller 26 retains multiple levels of duty ratios (average voltages) for a pulse signal supplied to the heater 18 and adjusts the output of the heater 18 by changing the duty ratio. Hereinafter, the control of the heater 18 performed by the controller 26 will be referred to as "heating control". In the heating control performed by the controller 26, increasing the output of the heater 18 increases the amount of heating, and decreasing the output of the heater 18 reduces the amount of heating.

When the fogging level of a captured image is a predetermined threshold or higher, the controller 26 regards the captured image as blur and determines the start of heating. Whether or not the fogging level is the predetermined threshold or higher is a condition for starting the heating. As an example, when the fogging level is higher than 50%, i.e., when the number of regions in which no feature point can be detected is 13 or greater among 25 regions, the controller 26 determines the start of heating. In this way, the controller 26 determines the start of heating based on the fogging level of a captured image. Also, the controller 26 may regard a captured image as blur and determine the start of heating when the fogging levels of temporally successive captured images are continuously the predetermined threshold or higher.

On the other hand, when the number of regions in which no feature point can be detected is 50% of the total number or less, i.e., when the number of such regions is 12 or fewer, the controller 26 regards the captured image as clear and does not start the heating.

The controller 26 increases the output of the heater 18 to remove the fogging faster when the fogging level is high, and decreases the output of the heater 18 to save power consumption when the fogging level is low. When the detected temperature is a predetermined temperature or higher, the controller 26 decreases the output of the heater 18 to prevent excessive heating by the camera 10. Namely, when the fogging level is higher and the detected temperature is lower, the controller 26 increases the output of the heater 18 to remove the fogging faster. When the fogging level is lower and/or the detected temperature is higher, the controller 26 decreases the output of the heater 18 to prevent excessive heating. The controller 26 may perform control using each of the absolute values of the fogging level and the detected temperature, and the variations of the fogging level and the detected temperature.

The controller 26 adjusts the output of the heater 18 so that the fogging level is kept lower than or equal to a predetermined reference value, and the detected temperature is kept constant. By performing the heating so that the temperature detected by the temperature sensor 19 is kept constant, the number of tuning on and off of the heater 18 can be reduced, and repetition of rapid heating and rapid cooling of the windshield 12 can be prevented. In the following, the state where the detected temperature is kept constant will be described with reference to a new drawing.

Figure 4:
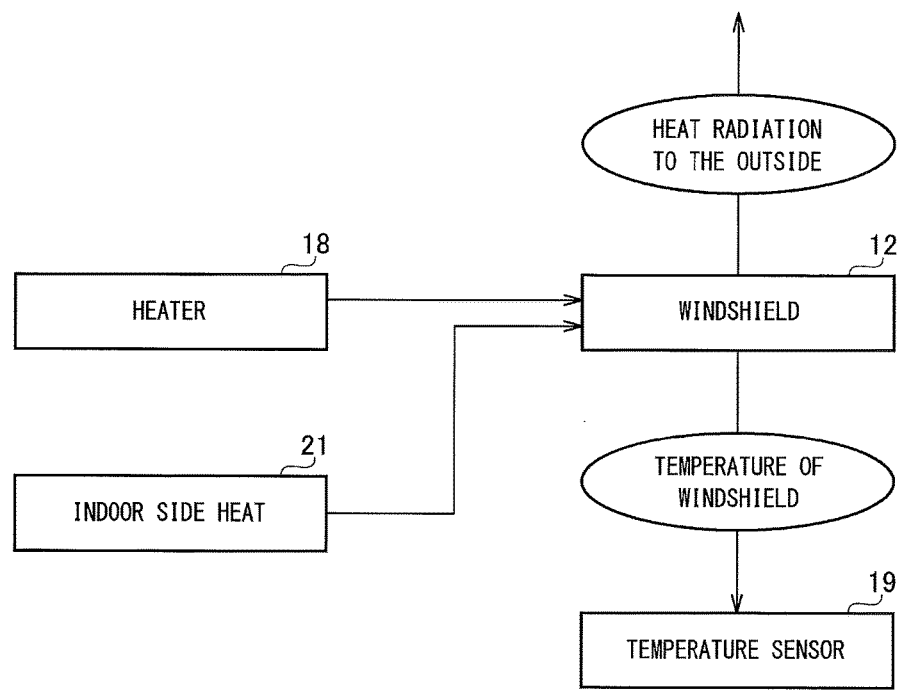
FIG. 4 is a diagram for describing a temperature of a windshield.

FIG. 4 is a diagram for describing a temperature of the windshield 12. Glass fogging is generally caused when a low temperature outside the vehicle lowers the temperature of air near the glass, and moisture included in the air near the glass is released on the glass surface. Accordingly, when glass fogging occurs, the controller 26 activates the heater 18 to heat the imaging region 16, thereby promptly defogging the imaging region 16.

The windshield 12 is heated by the heat provided by the heater 18 and also by indoor side heat 21. The indoor side heat 21 includes heat of air within a vehicle cabin heated by an air conditioner, and heat of the camera 10. The heated windshield 12 radiates heat outside. Accordingly, the temperature of the windshield 12 is determined by the amount of heating and the amount of heat radiation.

Namely, when the controller 26 adjusts the output of the heater 18 so that the amount of heating and the amount of heat radiation on the windshield 12 are in balance with each other, the temperature detected by the temperature sensor 19 can be kept constant.

The description will now return to FIG. 2. When the detected temperature is a predetermined first temperature or higher, the controller 26 may temporarily stop the energization of the heater 18. Although the circuit of the camera 10 has a function to automatically stop the operation thereof when the temperature is an operation stop temperature or higher, by allowing the controller 26 to provide control so that the detected temperature does not exceed the predetermined first temperature, the stop of the circuit of the camera 10 can be prevented. The first temperature is set lower than the operation stop temperature of the circuit of the camera 10. When heating is temporarily stopped, the heating is restarted when the temperature becomes low, even though the condition for starting the heating is not met.

When a predetermined termination condition is met, such as when the ignition switch is turned off, for example, the controller 26 terminates the heating control. The heating termination condition may include the condition of the detected temperature being a predetermined second temperature or higher. When the heating termination condition is met, the heating will not be performed again until the condition for starting the heating is met.

Figure 5A:
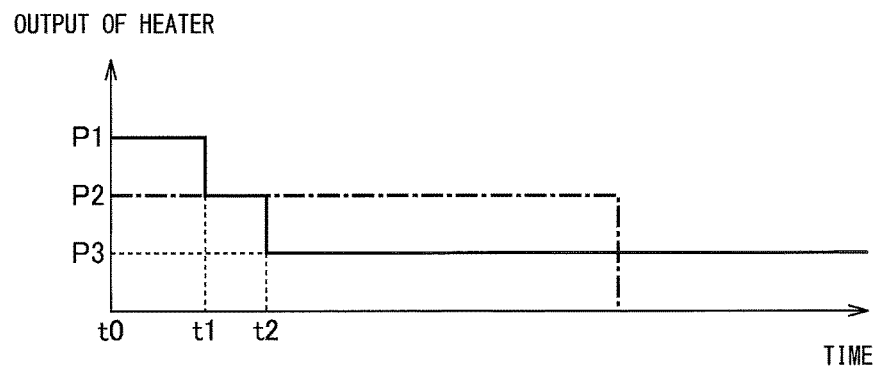
FIGS. 5A-5C are diagrams for describing an example of heating control.
Figure 5B:
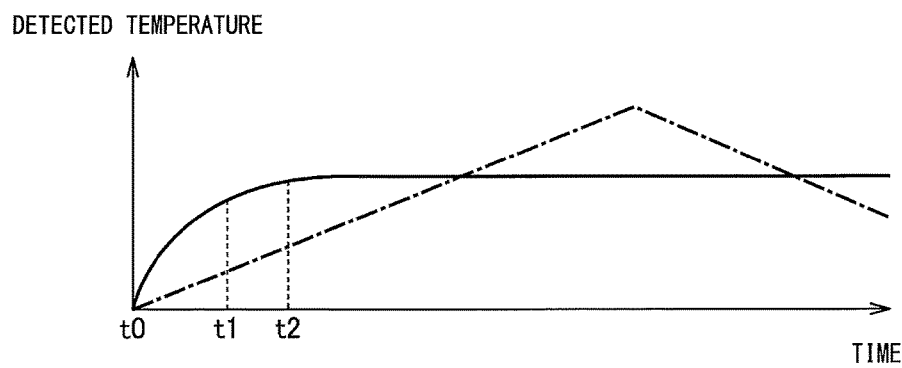
Figure 5C:
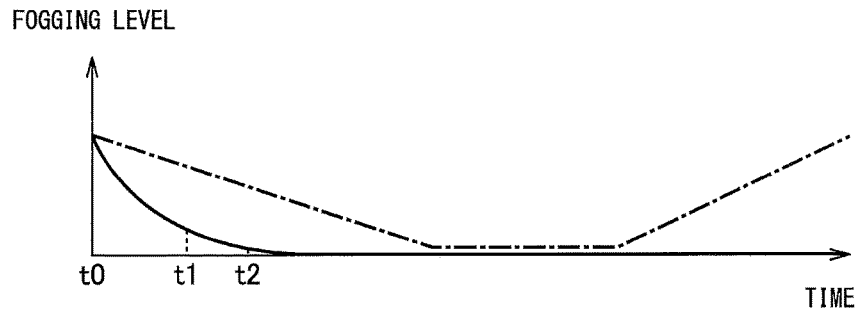

FIG. 5 are diagrams for describing an example of heating control. FIG. 5A shows the output of the heater 18, FIG. 5B shows the detected temperature of the temperature sensor 19, and FIG. 5C shows the fogging level of the imaging region 16. Each of FIG. 5 also shows heating control in a comparative technique with a dashed dotted line.

As shown in FIG. 5C, since the fogging level is higher than or equal to a predetermined threshold at time t0, the controller 26 determines an output P1 of the heater 18 based on the fogging level and detected temperature, and starts heating control with the output P1.

From the time t0 to time t1, the fogging level falls and the detected temperature rises. At the time t1, since the fogging level has fallen and the detected temperature has risen, the controller 26 decreases the output of the heater 18 from the output P1 to an output P2.

From the time t1 to time t2, the fogging level falls and the detected temperature rises, but the variations of the fogging level and the detected temperature are smaller than those between the time t0 and time t1. At the time t2, the fogging level is almost 0%, so that the controller 26 decreases the output of the heater 18 from the output P2 to an output P3.

After the time t2, since the detected temperature is constant and the fogging level is maintained at 0%, the controller 26 provides control for maintaining the heating with the output P3. In this way, in the heating control of the embodiment, the heating is continued after the fogging is removed. When the ignition switch is turned off, the controller 26 terminates the heating control.

In the heating control of the comparative technique indicated by dashed dotted lines, the output of the heater 18 is fixed, and the windshield 12 is defogged by controlling the on and off of the heater 18. According to the comparative technique, after the heater 18 is turned off, the windshield 12 is cooled to fog up again and is heated again accordingly, so that cooling and heating of the windshield 12 will be repeated.

According to the heating control of the embodiment, since heating is performed so that the detected temperature is kept constant, the number of tuning on and off of the heater 18 can be reduced, and repetition of rapid heating and rapid cooling of the windshield 12 can be prevented. Also, between the time t0 and t1, the fogging level can be lowered faster by performing heating with a greater output compared to the heating control of the comparative technique, and, after the time t1, the output of the heater 18 is decreased so that excessive heating and power consumption can be prevented. Further, monitoring the detected temperature can prevent the camera 10 reaching a high temperature.

Figure 6:
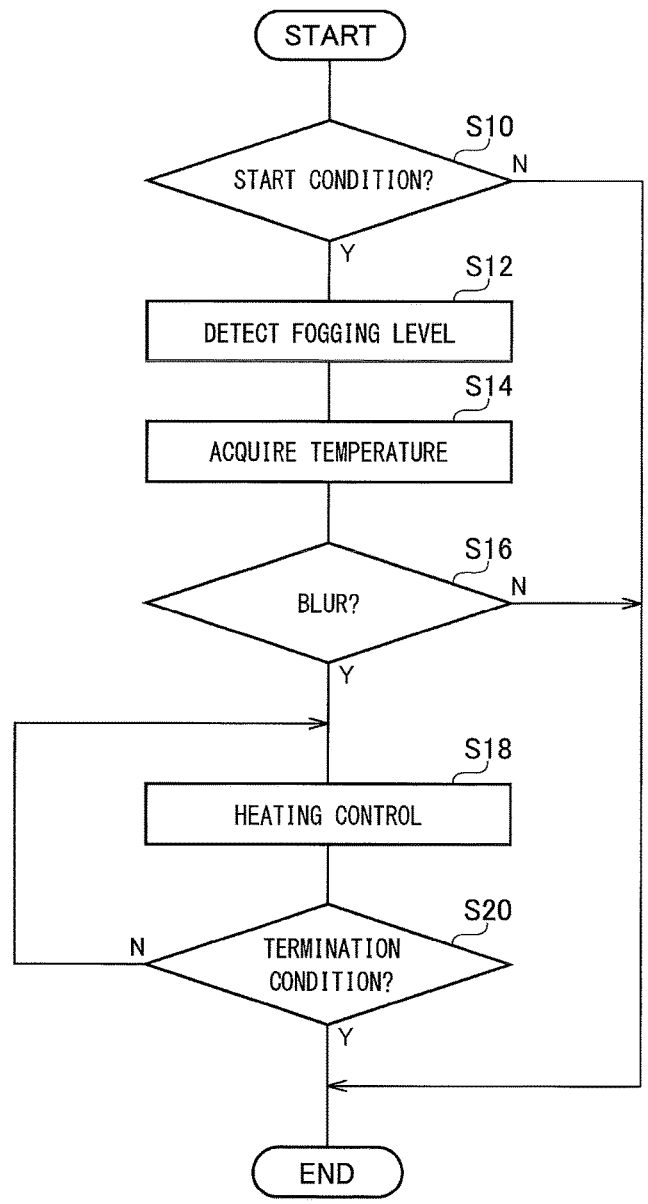
FIG. 6 is a flowchart of heating control processing.

FIG. 6 is a flowchart of heating control processing. The controller 26 judges whether a predetermined start condition is met (S10). When the start condition is met (Y at S10), heating control processing is performed. The start condition includes at least the condition of the start switch of the vehicle 2 being operated and the ignition (IG) switch being turned on. As stated previously, since the image processer 22 can suitably detect a feature point when the vehicle 2 travels at a predetermined speed (5 km/h, for example) or higher, processing for judging an imaging state may be performed when the IG switch is turned on and the speed of the vehicle 2 is a predetermined speed (5 km/h, for example) or higher. When the start condition is not met (N at S10), the controller 26 terminates the processing.

When the heating control is started, the controller 26 acquires a fogging level from the image processer 22 (S12) and also acquires a detected temperature from the temperature acquirer 24 (S14). Based on the fogging level, the controller 26 determines whether or not the captured image of the imaging region 16 is blur (S16). When the captured image is not blur (N at S16), the processing is terminated.

When the captured image is blur (Y at S16), i.e., when the fogging level is a predetermined threshold or higher, the controller 26 starts heating. The controller 26 determines the output of the heater 18 based on the fogging level and detected temperature and adjusts the output of the heater 18 (S18).

When a predetermined termination condition is met (Y at S20), such as when the IG switch is turned off, the controller 26 terminates the processing. When the predetermined termination condition is not met (N at S20), the controller 26 continues the heating even when the captured image is not blur.

The embodiment is intended to be illustrative only, and it will be obvious to those skilled in the art that various modifications to a combination of constituting elements could be developed and that such modifications also fall within the scope of the present disclosure.

As described in the embodiment, glass fogging is caused when the outside temperature is low and moisture included in the air near a glass is released on the glass surface. Accordingly, the vehicle 2 is provided with a temperature sensor for measuring the outside temperature and, when the outside temperature measured by the temperature sensor is a predetermined temperature or lower, the controller 26 may judge that glass fogging is likely to occur and may perform heating control of the heater 18.

The embodiment describes an example in which the camera 10 is mounted on the vehicle 2 so as to capture an image of an area in front of the vehicle 2. However, the camera 10 may be mounted on the vehicle 2 so as to capture an image of an area in a different direction, such as an area in back of the vehicle 2 or an area on a side of the vehicle 2.

Although the embodiment describes a mode in which the controller 26 adjusts the output of the heater 18 based on the fogging level and detected temperature, the mode is not limited thereto. For example, the controller 26 may adjust the output of the heater 18 based on the fogging level, without using the detected temperature.

Although the embodiment describes a mode in which the output of the heater 18 is adjusted by changing the duty ratio, the mode is not limited thereto. For example, the heater 18 may be configured by multiple hot wires having respective independent electrical systems, and the output of the heater 18 may be adjusted by changing the number of hot wires to be energized.

Although the embodiment describes a mode in which the image processer 22, which processes an image captured by the imager 13, is used as a fogging level detector for detecting the fogging level of the imaging region 16 of the windshield 12, the mode is not limited thereto. For example, a laser or the like may be provided as an object detecting sensor on the camera 10, and the fogging level may be obtained based on the detection result.

Although the embodiment describes a mode in which heating is started when the fogging level is higher than 50%, the mode is not limited thereto. For example, when the detected fogging level is higher than 0%, heating may be started according to the detected fogging level.

What is claimed is:

1. An imaging system mounted on a vehicle, the imaging system comprising:
    an imager configured to capture an image of the outside of a vehicle through a glass of the vehicle, the imager having an operation stop temperature over which the imager stops operating;
    a heater configured to heat at least a glass region included in an imaging range of the imager;
    a fogging level detector configured to detect a fogging level of the glass region;
    a controller configured to adjust the output of the heater on the basis of the detected fogging level and allow the heater to heat the glass region; and
    a temperature detector configured to detect a temperature of the glass region, wherein
    the controller adjusts the output of the heater on the basis of the fogging level and the temperature detected by the temperature detector, and controls the heater so that the detected temperature does not exceed a predetermined first temperature,
    the first temperature is set lower than the operation stop temperature of the imager.

2. The imaging system of claim 1, wherein the controller adjusts the output of the heater so that the fogging level is maintained lower than or equal to a predetermined value and the temperature detected by the temperature detector is maintained constant.

* * * * *